2,208,796

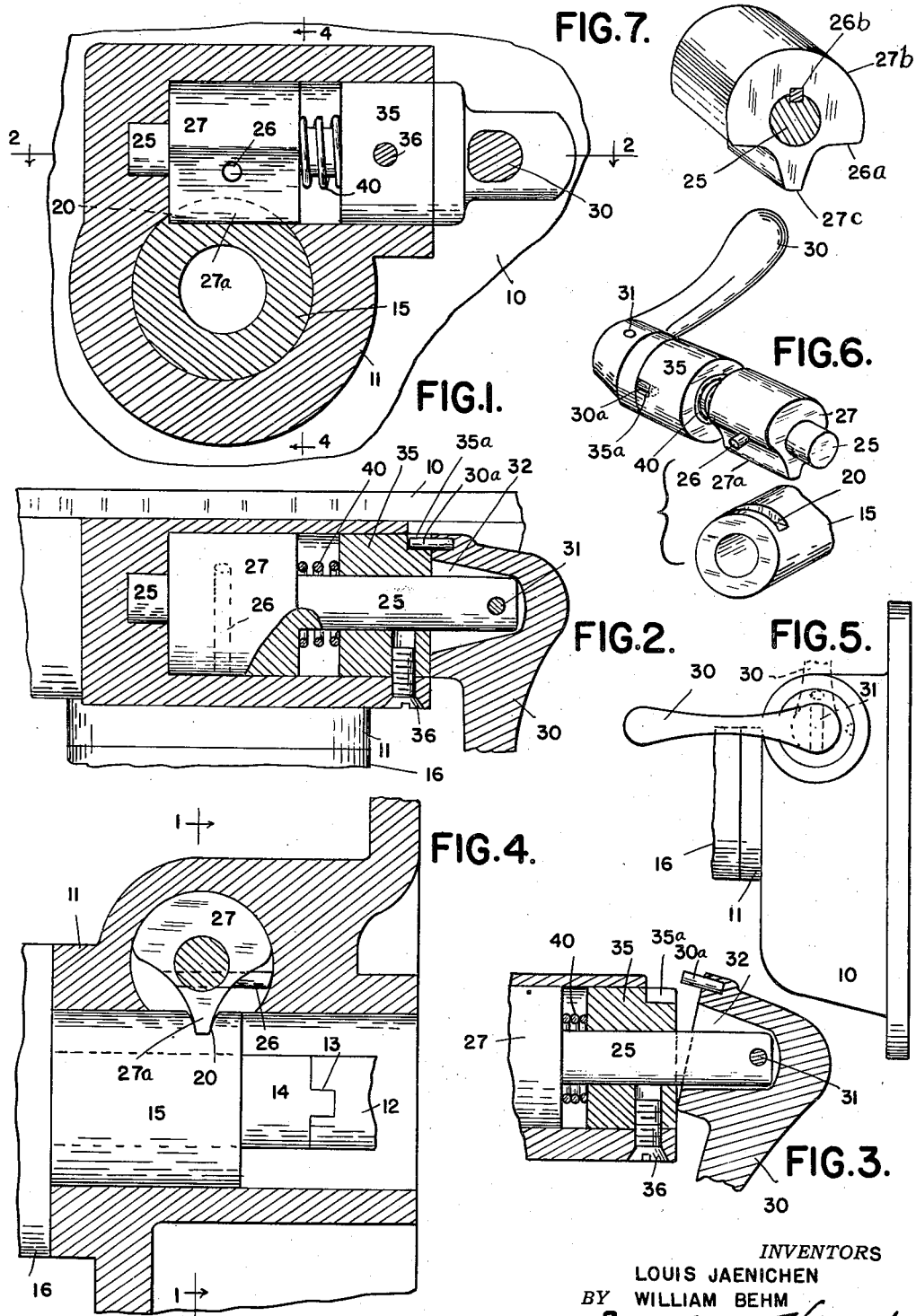
July 23, 1940. L. JAENICHEN ET AL 2,208,796
LOCKING DEVICE FOR FOOD CHOPPER BOWLS
Filed May 20, 1938
INVENTORS
LOUIS JAENICHEN
WILLIAM BEHM
BY
ATTORNEYS Patented July 23, 1940

UNITED STATES PATENT OFFICE 2,208,796

LOCKING DEVICE FOR FOOD CHOPPER BOWLS

Louis Jaenichen, Springfield Township, Oakland County, and William Behm, Detroit, Mich., assignors to The Standard Computing Scale Company, Detroit, Mich., a corporation of Michigan Application May 20, 1938, Serial No. 209,144

4 Claims. (Cl. 287—119)

The present invention relates to means for securing and locking in place food chopper bowls upon motor units.

Among the objects of the invention is a device of this kind which may be easily and quickly operable to securely fix the chopper bowl in place.

Another object is a device which is not only easily operable to unfasten the bowl but in this operation causes a positive substantial movement of the bowl from its locked position.

Still other objects and advantages will be apparent to those skilled in the art upon reference to the following description and the accompanying drawing in which Figure 1 is a section on line 1—1 of Figure 4.

Figure 2 is a section on line 2—2 of Figure 1.

Figure 3 is also a section on line 2—2 of Figure 1, but showing the parts in a different position.

Figure 4 is a section on line 4—4 of Figure 1.

Figure 5 is a partial side elevation of the bowl and attaching portion of the motor unit.

Figure 6 is a perspective view of the cooperating active parts of the locking device.

Figure 7 is a perspective view of another form of the gear member.

In the drawing showing a preferred form of embodiment of the invention, the flanged cover member of a power unit is shown at 10, this being provided with a female socket portion 11 surrounding the end 12 of a drive shaft notched as indicated at 13 for driving connection with the end 14 of the food chopper screw.

The socket 11 is of proper size to receive the reduced end 15 of a chopper bowl 16 (only partially shown) which reduced end 15 is provided with a transverse notch 20 near its extremity and upon the side uppermost when the bowl 16 is in position for use.

As indicated, the cover member 10 is provided with an enlargement in its upper portion and is bored transversely to receive the locking device shown as an assembly in Figure 6.

This device consists of a shaft 25 having fixed near one end, as by a pin 26, a toothed member 27 and at its other end a handle 30, the handle being tiltably mounted by means of a pin 31 and slotted as at 32 to permit a limited tilting. Between the handle 30 and member 27 is a rotatable block 35 arranged to fit in the end of the transverse bore and be fixed in position by any suitable means such as a screw 36. Also on the shaft 25 and between member 27 and block 35 is a spring 40 tending to thrust these apart and therefore the handle 30 against block 35.

Further, block 35 is, as shown, provided with a notch 35a into which a pin 30a carried by handle 30 and adapted to prevent relative rotation of block and handle unless the latter is tilted (as in Figure 3).

The toothed member 27 consists of a generally cylindrical element having formed along one side a single gear tooth 27a adapted to coact with notch 20 which is itself formed as the space between two gear teeth. Also the pin 26 which fixes the member 27 to shaft 25, may be extended, as shown, from one side of member 27 to substantially the plane of the cylindrical surface of the member. These parts form in effect a form of rack and pinion, the rack being the part 15 and the pinion being the part 27 with, in effect, two teeth. One tooth is, of course, the tooth 27a and the other the pin 26 which acts against the end of part 15.

Instead of making the gear 27 in the manner just described, it may also be made as indicated in Figure 7. That is, the body portion 27b is cut away to form a tooth 27a and a shoulder 26a to take the place and function of pin 26. This gear 27b may be fixed to shaft 25 by a suitable key as indicated at 26b.

As indicated best in Figure 4, the relative location of the several parts is such that, when the member 27 or 27b is rotated clockwise (Figure 4), the tooth 27a will move part 15 of the bowl slightly toward the left and the pin 26 or shoulder 26a will contact the end of part 15 and move it a relatively greater amount.

The operation of the device is simple. When the handle is in the full line position of Figure 5, the parts are locked. When it is desired to separate the parts, the handle 30 is tilted, as in Figure 5, to withdraw the pin 30 from notch 35a and the handle rotated to the dotted line position of Figure 5 or slightly further. This movement partially ejects the bowl and permits its easy removal. Insertion of the bowl and return of the handle to the dotted line position of Figure 5, of course, secures the bowl in position for use.

By making the notch 20 of sufficient depth to give its bottom sufficient length and by making member 27 of suitable length and of such size that the tooth 27a contacts the said bottom, the bowl is securely fixed against rotation.

Now having described the invention and the preferred embodiment thereof, it is to be understood that said invention is to be limited, not to the specific details herein set forth, but only by the scope of the claims which follow.

What I claim is:

1. Means for securing a food chopper bowl to a power unit consisting of a socket portion on said unit, a reduced portion carried by said bowl and adapted to fit in said socket, said reduced portion being provided with a transverse notch having a bottom surface non-concentric with respect to the axis of said reduced portion, a transversely arranged toothed member extending across said socket and provided with a tooth adapted to fit into and substantially fill the notch in said reduced portion, being engageable with both sides of said notch, and swingable into and out of the path of said reduced portion, means for rotating the toothed member whereby to move said toothed portion in said notch, and thereby also to move said bowl portion longitudinally in either direction.

2. Means as set forth in claim 1 in which said reduced portion is provided with an abutment spaced from said notch, and an actuating portion projecting from said toothed member, angularly spaced from said tooth, and engageable with said abutment to increase the range of longitudinal movement of the bowl portion effected by rotation of said toothed member.

3. In combination with a power unit provided with a socket for a detachable food chopper bowl, a chopper bowl having a male portion fitting in said socket, said male portion having a transverse, non-concentric notch therein, means for fixing the bowl against displacement comprising a rotatable shaft extending transversely of said socket and carrying a single-toothed gear having its tooth conforming in shape to said notch, a fixed bearing block for said shaft, a handle mounted on one end of said shaft adjacent said block and tiltable on an axis transverse to the axis of said shaft, resilient means between said block and gear, and coacting means on said handle and block for preventing handle rotation, said handle being constructed and arranged to render, when tilted, said coacting means inoperative to prevent said rotation.

4. In combination with a power unit provided with a socket for a detachable food chopper bowl, a chopper bowl having a notched portion fitting in said socket, means for fixing the bowl against displacement comprising a rotatable shaft extending transversely of said socket and carrying a single-toothed element, a fixed bearing block for said shaft, a handle mounted on one end of said shaft adjacent said block and tiltable on an axis transverse to the axis of said shaft, resilient means between said block and gear, and coacting means on said handle and block for preventing handle rotation, said handle being constructed and arranged to render, when tilted, said coacting means inoperative, the single tooth on said toothed element being formed to fit the notch of said bowl to prevent rotation of the bowl in said socket.

LOUIS JAENICHEN.
WILLIAM BEHM.